United States Patent
Tanaka et al.

(10) Patent No.: US 10,917,839 B2
(45) Date of Patent: Feb. 9, 2021

(54) COMMUNICATION DEVICE, COMMUNICATION METHOD, AND COMPUTER PROGRAM PRODUCT

(71) Applicant: Kabushiki Kaisha Toshiba, Minato-ku (JP)

(72) Inventors: Yasuyuki Tanaka, Chigasaki (JP); Hiroki Kudo, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 71 days.

(21) Appl. No.: 16/114,704

(22) Filed: Aug. 28, 2018

(65) Prior Publication Data

US 2019/0268836 A1  Aug. 29, 2019

(30) Foreign Application Priority Data

Feb. 28, 2018 (JP) ................ 2018-035703

(51) Int. Cl.
| | |
|---|---|
| *H04W 48/18* | (2009.01) |
| *H04W 40/02* | (2009.01) |
| *H04W 4/80* | (2018.01) |
| *H04W 48/20* | (2009.01) |
| *H04W 4/70* | (2018.01) |
| *H04L 12/761* | (2013.01) |

(52) U.S. Cl.
CPC ............ *H04W 48/18* (2013.01); *H04L 45/16* (2013.01); *H04W 4/70* (2018.02); *H04W 4/80* (2018.02); *H04W 40/02* (2013.01); *H04W 48/20* (2013.01)

(58) Field of Classification Search
None
See application file for complete search history.

(56) References Cited

U.S. PATENT DOCUMENTS

| | | | | |
|---|---|---|---|---|
| 2008/0317047 A1* | 12/2008 | Zeng | ....................... | H04L 45/00 370/401 |
| 2015/0131637 A1* | 5/2015 | Rubin | .................... | G08G 1/166 370/337 |
| 2016/0262098 A1* | 9/2016 | Vijayasankar | .... | H04W 52/0209 |

(Continued)

FOREIGN PATENT DOCUMENTS

| | | |
|---|---|---|
| JP | 2011-228955 | 11/2011 |
| JP | 2013-143574 A | 7/2013 |
| JP | 2015-12447 A | 1/2015 |

(Continued)

OTHER PUBLICATIONS

S. Farrell, "LPWAN Overview, draft-ietf-lpwan-overview-07," Trinity College Dublin, 2017, pp. 41.

*Primary Examiner* — Saba Tsegaye
(74) *Attorney, Agent, or Firm* — Oblon, McClelland, Maier & Neustadt, L.L.P.

(57) ABSTRACT

According to one embodiment, a communication device includes one or more processors. The one or more processors functions as a wireless transmission unit, a plurality of communication control units, and a selection unit. The wireless transmission unit communicates in accordance with a set wireless transmission scheme. The communication control units control the wireless transmission unit by different wireless transmission schemes. The selection unit selects one communication control unit to be applied from among the communication control units in accordance with a set selection condition.

10 Claims, 5 Drawing Sheets

(56) References Cited

U.S. PATENT DOCUMENTS

2018/0359789 A1\* 12/2018 Yang .................... H04W 76/28
2019/0082028 A1    3/2019 Tanaka

FOREIGN PATENT DOCUMENTS

| JP | 2016-54476 A | 4/2016 |
| JP | 2019-50524 A | 3/2019 |
| WO | WO 2017/188423 A1 | 11/2017 |

\* cited by examiner

FIG.4

| 0 | 1 | 2 | 3 | 4 |
|---|---|---|---|---|
| SHARE | | | | |

FIG.5

| 0 | 1 | 2 | 3 | 4 |
|---|---|---|---|---|
| SHARE | 100a→100b | | | |

FIG.6

| | 0 | 1 | 2 | 3 | 4 |
|---|---|---|---|---|---|
| SLOT FRAME 1 (SHORT DISTANCE) | SHARE | 100a→100b | | | |
| SLOT FRAME 2 (LONG DISTANCE) | | | | | 100a→SERVER |

COMMUNICATION DEVICE, COMMUNICATION METHOD, AND COMPUTER PROGRAM PRODUCT

CROSS-REFERENCE TO RELATED APPLICATIONS

This application is based upon and claims the benefit of priority from Japanese Patent Application No. 2018-035703, filed on Feb. 28, 2018; the entire contents of which are incorporated herein by reference.

FIELD

Embodiments described herein relate generally to a communication device, a communication method, and a computer program product.

BACKGROUND

Examples of wireless transmission schemes include short-distance transmission schemes based on specifications such as IEEE 802.15.4-2015 and long-distance transmission schemes based on specifications such as low power wide area (LPWA).

In the conventional technology, however, in general, one of the short-distance transmission scheme and the long-distance transmission scheme is used, and a stable communication system is not always built. For example, the long-distance transmission scheme can build a broadband network but has a short data length that can be transmitted and received by wireless and cannot achieve bidirectional communications requiring the immediacy. The short-distance transmission scheme can treat longer data and support bidirectional communications, but has a short communication length.

BRIEF DESCRIPTION OF THE DRAWINGS

FIG. 4 is a diagram illustrating an example of a schedule in an initial state;

FIG. 5 is a diagram illustrating an example of the schedule;

FIG. 6 is a diagram illustrating an example of selection conditions expressed in the form of a communication schedule by TSCH;

DETAILED DESCRIPTION

Figure 1:
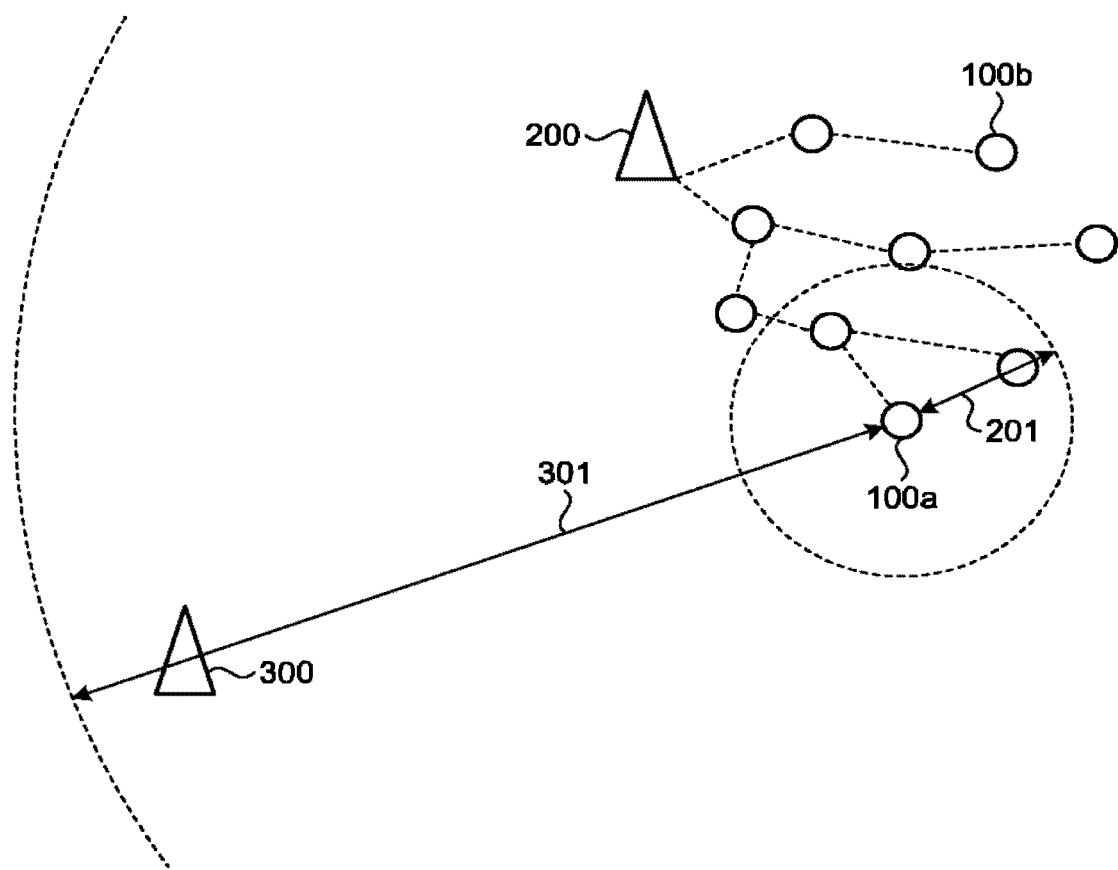
FIG. 1 is a block diagram of a communication system according to a first embodiment.

According to one embodiment, a communication device includes one or more processors. The one or more processors functions as a wireless transmission unit, a plurality of communication control units, and a selection unit. The wireless transmission unit communicates in accordance with a set wireless transmission me. The communication control units control the wireless transmission unit by different wireless transmission schemes. The selection unit selects one communication control unit 20 be applied from among the communication control units in accordance with a set selection condition.

Referring to the accompanying drawings, communication devices according to exemplary embodiments of the present invention are described in detail below.

The use of a wireless transmission scheme defined by IEEE 802.15.4-2015 enables communication at a data rate of 50 kbps to 20 kbps or more by wireless using Sub-GHz bands. Such a wireless transmission scheme can be used not only for communication aimed at data collection for transmitting data from a terminal to a base station or a server behind the station but also for communication aimed at control from a base station to a terminal. Outdoor broadband networks represented by a smart meter system are often built by a multi-hop network due to the constraint of the communication length. Such a wireless transmission scheme is hereinafter referred to as "short-distance transmission scheme".

Wireless transmission schemes called LPWA, including LoRa and SigFox, have a very long communication length and can build a star network by base stations and terminals even when building a broadband network. In general, however, LPWA has a low data rate of several hundreds of bps at most, a small size for one message, and a small duty ratio. It may be difficult for LPWA to secure downlink communication from a base station to a terminal depending on cases, and the applications are limited as compared with communication using IEEE 802.15.4-2015. Such a wireless transmission scheme is hereinafter referred to as "long-distance transmission scheme".

Using the long-distance transmission scheme for wireless communications in a 920 MHz band can build a broadband system with a star simple network configuration. Communication failures can be easily distinguished because of its simple network configuration. However, the data length that can be transmitted and received by wireless is reduced, and bidirectional communications requiring the immediacy cannot be performed.

The communication length is reduced if a short-distance transmission scheme that can treat longer data and can support bidirectional communications is used. Building a broadband system with a wireless transmission scheme having a short communication length needs a multi-hop network configuration. The configuration of the multi-hop network is, however, complicated and makes it difficult to distinguish communication failures.

For example, conventional smart meters are provided with only the function of connecting to a wireless mesh network. Thus, when the smart meter cannot be accessed through the wireless mesh network, the center server cannot determine whether the cause is that the communication status around the smart meter is poor or that the smart meter is broken. Using the communication by the long-distance communication scheme enables the center server to distinguish abnormality in connection to the wireless mesh network and abnormality in the smart meter itself. As a result, the flow of troubleshooting of the smart meter can be optimized.

As described above, it is desired to easily distinguish communication failures while treating longer data and achieving bidirectional communications requiring the immediacy. The wireless transmission schemes as used herein refer to schemes for what called physical layers. For example, a wireless transmission scheme is determined by a combination of settings of a modulation scheme, a transmission rate, a communication bandwidth, an encoding rate, and a reception filter. The settings of wireless transmission schemes are switched on a single wireless transmission unit (wireless chip).

In the following embodiments, the communication device selects a wireless transmission scheme to be used for communication depending on conditions. For example, the communication device selects one communication control unit depending on conditions from among a plurality of communication control units corresponding to a plurality of different wireless transmission schemes that can be set by a single wireless transmission unit. For processing that is needed as a wireless communication device, such as transmission time restriction processing defined by the radio law, the communication device operated so as to maintain consistency before and after the switching of the wireless transmission scheme.

In the case where two wireless transmission schemes including a short-distance transmission scheme and a long-distance transmission scheme are treated, use timings of the wireless transmission schemes may be allocated in a time-division multiplex manner as represented by scheduling by time-slotted channel hopping (TSCH).

In addition, the short-distance communication is used as communication primary and the long-distance communication is used as secondary communication, and control enable the secondary communication when not connected to a network by the short-distance communication (including case where failure has occurred) may be performed.

For example, the present embodiment is applicable to smart meters as configured as follows. First, connection to a wireless mesh network is used as the primary connection for the smart meter, and broadband connection by a long-distance communication scheme s used as the secondary connection for the smart meter. When the primary connection for the smart meter exists, the secondary connection is disabled. When the primary connection disconnected or before the primary connection is established, heartbeat notification using the secondary connection is made to a center server while searching for the primary connection. In this manner, the center server can more efficiently execute fault discrimination.

The wireless transmission schemes are not limited to the short-distance transmission scheme and the long-distance transmission scheme, and may be any combination of different schemes. By selecting an appropriate method from among wireless transmission schemes depending on conditions, a communication system that is more stable than hitherto can be built.

First Embodiment

FIG. 1 is a diagram illustrating a configuration example of a communication system according to a first embodiment. As illustrated in FIG. 1, the communication system includes nodes 100a and 100b as communication devices, a base station 200, and a base station 300.

The nodes 100a and 100b have substantially the same configuration, and are simply referred to as "nodes 100" unless otherwise distinguished. The number of the nodes 100 is not limited to two, and may be three or more. For example, circles in FIG. 1 may be nodes 100 other than the nodes 100a and 100b. The nodes 100 constitute a multi-hop network.

The base station 200 is a multi-hop network base station capable of connection using short-distance transmission scheme. The base station 300 is a base station capable of connection using long-distance transmission scheme. A communication range 201 is the range where communication is possible by short-distance transmission scheme. A communication range 301 is the range where communication is possible by long-distance transmission scheme.

When connecting by the multi-hop network, the node 100 cannot always directly communicate with a multi-hop network base station 200. In this case, a node near the node 100a transfers transmission and reception data to establish communication between the node 100a and the base station 200.

Figure 2:
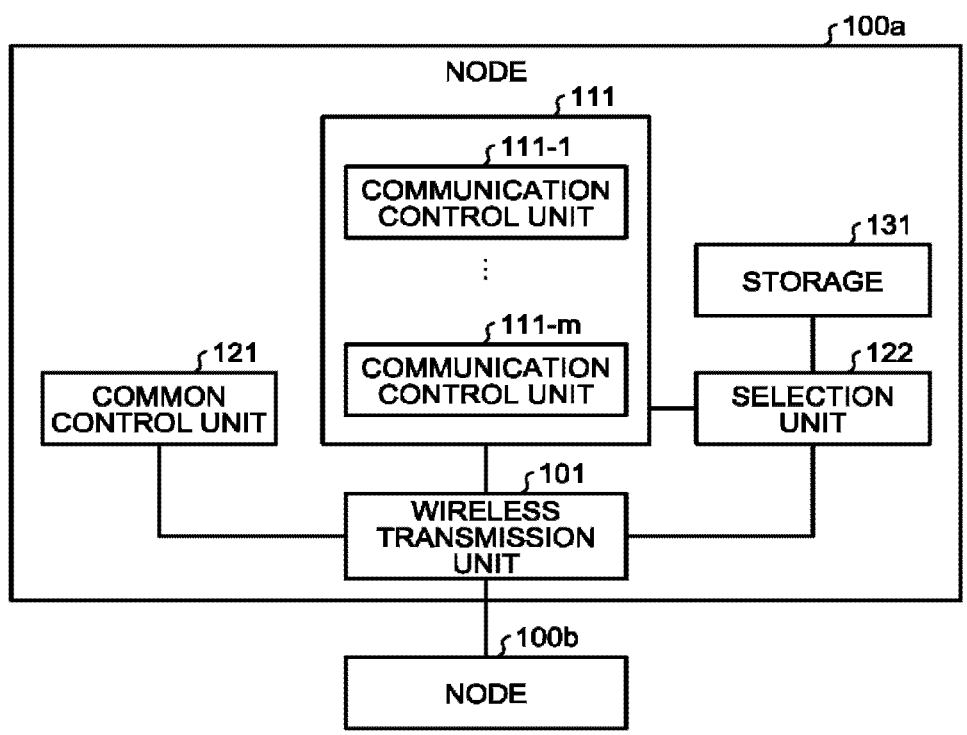
FIG. 2 is a block diagram of a node according to the first embodiment.

FIG. 2 is a block diagram illustrating an example of the configuration of the node 100a according to the first embodiment. As illustrated in FIG. 2, the node 100a includes a wireless transmission unit 101, a communication control unit group 111, a common control unit 121, a selection unit 122, and storage 131.

The wireless transmission unit 101 communicates with a neighborhood node or a base station (base station 200, base station 300) in accordance with the set wireless transmission scheme. For example, the wireless transmission unit 101 is formed by a single circuit (wireless chip), and can be operated by any one of a plurality of different wireless transmission schemes by changing the settings of a modulation scheme, a transmission rate, a communication bandwidth, an encoding rate, and a reception filter.

Note that, for example, a configuration in which a mobile phone terminal equipped with a long term evolution (LTE) chip and a Wi-Fi chip switches a transmission scheme between LTE and Wi-Fi is different from the wireless transmission unit 101 in the first embodiment because the mobile phone terminal uses two circuits (LTE chip, Wi-Fi chip).

The communication system in the first embodiment includes a plurality of networks having different configurations, specifically, a multi-hop network for the short-distance transmission scheme and a broadband network for the long-distance transmission scheme. The wireless transmission unit 101 can change the settings to perform communication through any of the networks. Such a configuration is different from, for example, a configuration in which communication through a wireless network is achieved by using a frequency set from among a plurality of frequencies.

The communication control unit group 111 includes a plurality of communication control units 111-1 to 111-$m$ ($m$ is a natural number). The communication control units 111-1 to 111-$m$ control the communication by the wireless transmission unit. 101 in accordance with different wireless transmission schemes. In the following, an example in which the communication control unit group 111 includes two communication control units (m=2), that is, a communication control unit configured to control communication by a short-distance transmission scheme and a communication control unit configured to control communication by a long-distance transmission scheme is mainly described, but the number of the communication control units may be three or more. For example, three communication control units obtained by adding a communication control unit configured to control communication by a medium-distance transmission scheme may be switched.

Each of the communication control units 111-1 to 111-$m$ also executes processing unique to a corresponding wireless transmission scheme. For example, a communication control unit using the short-distance transmission scheme executes communication control of TSCH or CSMA/CA (Carrier Sense Multiple Access/Collision Avoidance), control of routing protocols for the multi-hop network, and control of applications running in accordance with the short-distance transmission scheme. A communication control unit using the long-distance transmission scheme executes duty control specific long-distance communication, control of network protocols running in accordance with the long-distance transmission scheme, and control of applications running in accordance with the long-distance transmission scheme.

In this manner, the communication control unit group 111 can include a communication control unit (first communication control unit) configured to control communication processing by time-division multiplexing, such as TSCH. In the case of a communication scheme involving frequency hopping, such as TSCH, the communication control unit also controls a wireless channel used for communication in addition to communication timing, and communicates by using the wireless transmission unit 101 or the like.

The common control unit 121 controls functions common to transmission wireless schemes corresponding to the communication control units 111-1 to 111-$m$. For example, the common control unit 121 controls processing to be treated integrally as the node 100$a$ alone irrespective of the used wireless transmission scheme, such as transmission time restriction processing by the radio law. For example, even when the wireless transmission scheme switched, the common control unit 121 performs control to integrally treat a radio wave emission time and satisfy predetermined specifications irrespective of the wireless transmission scheme without resetting a counter for the total transmission time per unit time.

The selection unit 122 selects one communication control unit to be applied from among the communication control units 111-1 to 111-$m$ in accordance with the set selection conditions. For example, the selection unit 122 switches the wireless transmission scheme to be used in accordance with the selection conditions stored in the storage 131. For example, the selection conditions include at least one of time, a connection state of the network, and an operating state of the node 100$a$.

Examples of the selection conditions including time include conditions that "the Tireless transmission scheme is switched to a long-distance transmission scheme every hour on the hour (every hour 00 minutes 00 seconds) and switched to a short-distance transmission scheme after 30 seconds" and "the wireless transmission scheme is switched to a long-distance transmission scheme at 2:15:00 a.m. every day and switched to a short-distance transmission scheme after 20 seconds".

As the selection conditions, sensor data output from a sensor provided outside or inside the node 100$a$ may be used. For example, the condition that a short-distance transmission scheme is applied when the battery remaining amount of the node 100$a$ exceeds a threshold and a long-distance transmission scheme is applied when the battery remaining amount is equal to or lower than the threshold may be used. The transmission scheme to be applied may be determined in accordance with sensor data such as an illuminance sensor and a vibration sensor, n addition to the battery remaining amount. Such selection conditions correspond to conditions including the connection state of the network or the operating state of the node 100$a$.

Selection conditions based on sensor data can exist together with conditions based on time. Specifically, the selection conditions may include a plurality of conditions. When the conditions conflict or when there are a plurality of compatible conditions, priorities may be set among the conditions and a condition having high priority may be employed, or a condition randomly selected from among conflicting conditions may be applied.

Each of the above-mentioned units (wireless transmission unit 101, communication control unit group 111, common control unit 121, and selection unit 122) is implemented by one or more processors, for example. For example, each of the above-mentioned units may be implemented by a processor such as a central processing unit (CPU) executing a computer program, that is, software. Each of the above-mentioned units may be implemented by a dedicated processor such as an integrated circuit (IC), that is, hardware. Each of the above-mentioned units may be implemented by a combination of software and hardware. When processors are used, each processor may implement one of the units or implement two or more of the unit.

The storage 131 stores therein various kinds of data used for various kinds of processing by the node 100$a$. For example, the storage 131 stores therein information indicating selection conditions used by the selection unit 122. The storage 131 can be configured by any commonly used storage media such as a hard disk drive (HDD), an optical disc, a memory card, and a random access memory (RAM).

Figure 3:
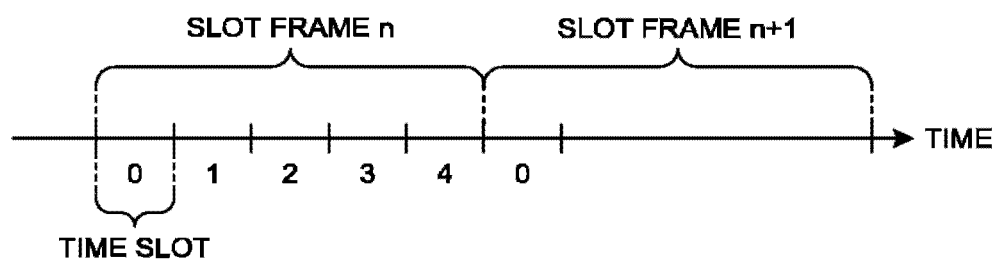
FIG. 3 is a diagram illustrating an example of divided units of time by time-division multiplexing.

Next, communication with time-division multiplexing is described. FIG. 3 is a diagram illustrating an example of division units of time by time-division multiplexing. As illustrated in FIG. 3, time-division multiplexing divides time into constant periods. The minimum unit of the divided periods is referred to as "time slot", and one or more time slots are collectively referred to as "slot frame". In the example FIG. 3, one slot frame includes five time slots.

Each time slot is managed so as to be uniquely identified in a slot frame. Each time slot appears periodically with lapse of time. In FIG. 3, the time slots are identified by indices of 0 to 4. Time slots having the same indices appear in every slot frame. Each slot frame is managed so as to be uniquely identified in a sufficiently long period. In the example in FIG. 3, the slot frames are provided with indices of "n" and "n+1". Each time slot may be managed with an absolute identifier. This cane can be regarded as a slot frame having infinitely long period having an infinite number of time slots.

To communicate between the node 100$a$ and the node 100$b$, it is necessary to define which of the nodes 100 transmits data in which of me slots and which of the nodes 100 receives data or both of the nodes 100 can transmit and receive data ("share" described later). Determining processing performed in a time slot for the time slot is referred to as "scheduling", and the result of the scheduling is referred to as "schedule". FIG. 4 is a diagram illustrating an example of a schedule in the initial state.

In the schedule in FIG. 4, the first time slot (time slot 0) in each slot frame is defined as "share". In the time slot of "share", the node 100$a$ may transmit data or the node 100$b$ may transmit data. Specifically, when the node 100$a$ and the node 100$b$ have data to be transmitted to the opponent, the node 100$a$ and the node 100$b$ can transmit data by using the first time slot in each slot frame. When having no data to be transmitted, each node 100 waits for the reception of data in the first time slot in each slot frame to prepare for data transmission.

Now consider a case where new scheduling performed to give the node 100$a$ an opportunity of data transmission. FIG. 5 is a diagram illustrating an example of a schedule set in this case.

When scheduling is not manually performed on the node 100$a$ and the node 100$b$, a schedule is adjusted between the node 100a and the node 100b by using a control protocol such as 6top Protocol (6P). For example, the node 100b and the node 100a can share the schedule in FIG. 5 also by the node 100b requesting the node 100a for a reception time slot dedicated to the node 100b.

In the case where frequency hopping (frequency switching) is performed between the node 100a and the node 100b, not only transmission and reception timings between the nodes but also channels to be used or channel offsets are set.

As described above, the communication control units 111-1 to 111-m may include a communication control unit configured to control communication processing by the time-division multiplex, such as TSCH. In this case, the short-distance transmission scheme and the long-distance transmission scheme are switched by using selection conditions expressed in the form of scheduling by TSCH. FIG. 6 is a diagram illustrating an example of selection conditions expressed in the form of a communication schedule by TSCH.

FIG. 6 illustrates an example where a schedule under the normal TSCH is set to one of two slot frames and a schedule by the long-distance transmission scheme is set to the other slot frame. The priority of slot frames may be defined for the case where the schedules for two slot frames conflict schedule by the TSCH (short-distance transmission scheme) and a schedule by the long-distance transmission scheme may be set in one slot frame.

In the first embodiment, unlike the normal schedule or slot frame by TSCH, information that can determine the type of a transmission scheme to be applied is provided to a schedule. A transmission method to be applied in units of slot frames may be defined, or a transmission method to be applied to each communication opportunity (cell) in a slot frame may be defined.

As illustrated in FIG. 6, the selection conditions expressed in the form of a schedule used in time-division multiplexing (such as TSCH) can include a designation of a cell corresponding to time (first time) at which communication by the time-division multiplexing is performed and a designation of a cell corresponding to time (second time) at which communication by another scheme (such as long-distance transmission scheme) is performed. In this case, the selection unit 122 selects a communication control unit configured to control communications by TSCH at a first time, and selects a communication control unit configured to control communications by another method at a second time.

Figure 7:
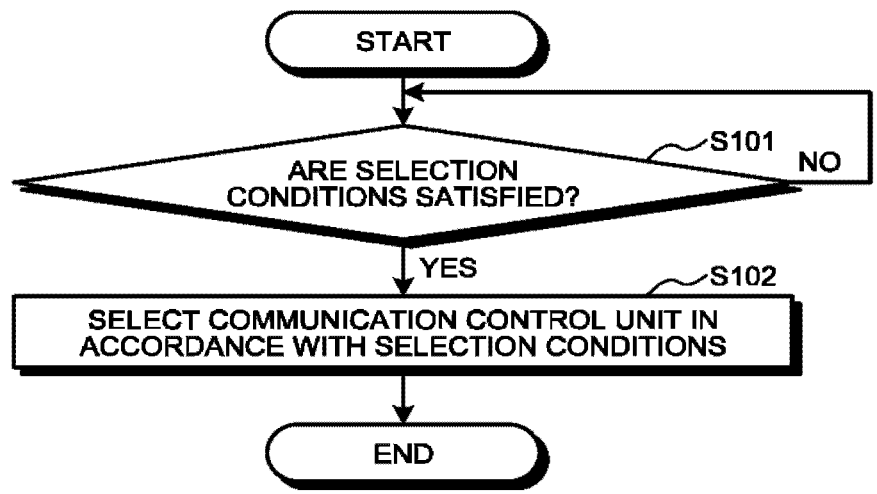
FIG. 7 is a flowchart illustrating an example of selection processing in the first embodiment.

Next, selection processing by the node 100a according to the first embodiment configured as above is described. FIG. 7 is a flowchart illustrating an example of the selection processing in the first embodiment. The selection processing is processing where the selection unit 122 selects a communication control unit to be applied.

The selection unit 122 determines whether the selection conditions are satisfied in response to the lapse of time, the input from a sensor, or an instruction by a user (Step S101).

For example, in the case where the selection conditions as illustrated in FIG. 6 are used, the selection unit 122 switches to TSCH at a time corresponding to the time slot 1 in a slot frame for the short-distance transmission scheme. The selection unit 122 switches to the long-distance transmission scheme at a time corresponding to the time slot 4 in a slot frame for the long-distance transmission scheme.

When the selection conditions are not satisfied (No at Step S101), the selection unit 122 repeats the determination processing until the selection conditions are satisfied. When the selection conditions are satisfied (Yes at Step S101), the selection unit 122 selects a communication control unit that satisfies the selection conditions (Step S102). After that, the selected communication control unit controls the communication between the node 100a and another device.

In this manner, the node 100a in the first embodiment selects a wireless transmission scheme to be used for communication from among wireless transmission schemes depending on the conditions. Consequently, a stable communication system can be built.

Second Embodiment

Figure 8:
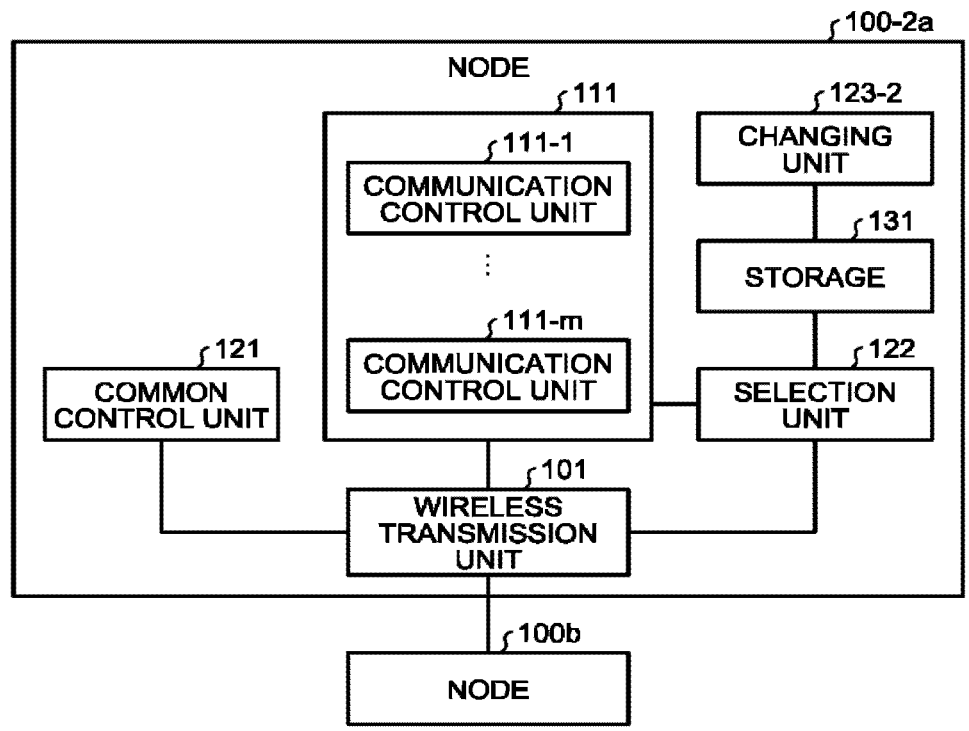
FIG. 8 is a block diagram of a node according to a second embodiment.

In a second embodiment, the selection conditions can be changed. FIG. 8 is a block diagram illustrating an example of a configuration of a node 100-2a according to the second embodiment. As illustrated in FIG. 8, the node 100-2a includes a wireless transmission unit 101, a communication control unit group 111, a common control unit 121, a selection unit 122, storage 131, and a changing unit 123-2.

The second embodiment is different from the first embodiment in that the changing unit 123-2 is added. The other configurations and functions are the same as in FIG. 2, which is a block diagram of the nude 100a according to the first embodiment, and are denoted by the same reference symbols, and descriptions thereof are omitted.

The changing unit 123-2 changes selection conditions referred to by the selection unit 122. For example, the changing unit 123-2 changes the selection conditions in response to an instruction from the outside. The instruction from the outside may be an instruction by user operation or an instruction through a communication schedule setting protocol as represented by 6top Protocol. In other words, the setting of the selection conditions can be changed at any timing manually and automatically.

In this manner, the communication device according to the second embodiment can change selection conditions depending on, for example, the support state of the communication scheme of a neighborhood node. Consequently, a more stable communication system can be built.

Figure 9:
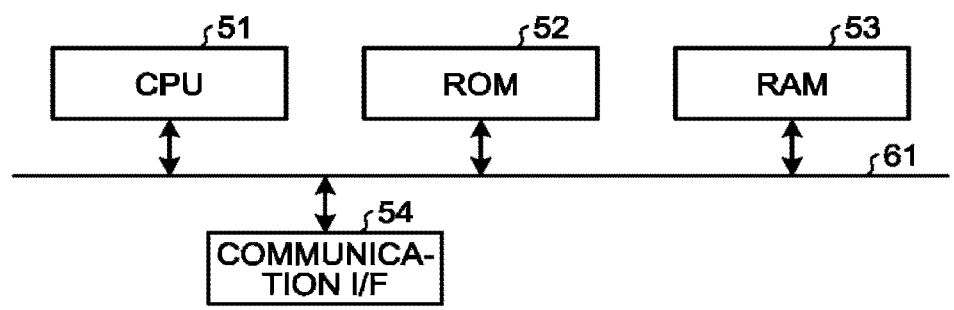
FIG. 9 is a hardware configuration diagram of the node according to the first or second embodiment.

Next, the hardware configuration of the communication device according to the first or second embodiment is described with reference to FIG. 9. FIG. 9 is an explanatory diagram illustrating a hardware configuration example of the communication device according to the first or second embodiment.

The communication device according to the first or second embodiment includes a control device such as a central processing unit (CPU) 51, a storage device such as a read only memory (ROM) 52 and a random access memory (RAM) 53, a communication I/F 54 to be connected to a network for communication, and a bus 61 configured to connect the units.

A computer program executed by the communication device according to the first or second embodiment is provided by being incorporated in the ROM 52 or the like in advance.

The computer program executed by the communication device according to the first or second embodiment may be recorded in a computer-readable recording medium, such as a compact disc read only memory (CD-ROM), a flexible disk (FD), a compact disc recordable (CD-R), and a digital versatile disc (DVD), as a file in an installable format or an executable format, and provided as a computer program product.

The computer program executed by the communication device according to the first or second embodiment may be stored on a computer connected to a network such as the Internet, and may be provided by being downloaded through the network. The computer program executed by the communication device according to the first or second embodiment may be provided or distributed through a network such as the Internet.

The computer program executed by the communication device according to the first or second embodiment can cause a computer to function as each unit in the above-mentioned communication device. The computer can read and execute a computer program from a computer-readable storage medium onto a main storage device by the CPU 51.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit the inventions.

What is claimed is:

1. A communication device, comprising:
   a wireless transmitter configured to communicate in accordance with a set wireless transmission scheme;
   a plurality of communication controllers configured to control the wireless transmitter by different wireless transmission schemes; and
   a selector configured to select one communication controller to be applied from among the communication controllers in accordance with a set selection condition, wherein
   the wireless transmission schemes are determined by a combination of settings of a modulation scheme, a transmission rate, a communication bandwidth, an encoding rate, and a reception filter.

2. The communication device according to claim 1, wherein the selection condition includes at least one of a time, a connection state of a network, and an operating state of the communication device.

3. The communication device according to claim 1, further comprising a changing processor configured to change the selection condition.

4. The communication device according to claim 1, further comprising a common controller configured to control a function common to a plurality of wireless transmission schemes corresponding to the respective communication control units controllers.

5. The communication device according to claim 1, wherein the communication controllers are configured to control communication by a network protocol corresponding to respective wireless transmission schemes.

6. The communication device according to claim 1, wherein the communication controllers are configured to control an application corresponding to respective wireless transmission schemes.

7. The communication device according to claim 1, wherein
   the communication controllers include a first communication controller configured to control communication in accordance with time-division multiplexing,
   the selection condition indicates a communication schedule by the time-division multiplexing, the communication schedule including a designation of a time at which the first communication controller is applied and a designation of a time at which a communication controller other than the first communication controller is applied, and
   the selector selects the first communication controller or the communication controller other than the first communication controller based on the designated time.

8. The communication device according to claim 1, wherein the selection condition includes conditions provided with priorities.

9. A communication method to be executed by a communication device including: a wireless transmitter configured to communicate in accordance with a set wireless transmission scheme; and a plurality of communication controllers configured to control the wireless transmitter by different wireless transmission schemes,
   the communication method comprising:
      selecting one communication controller to be applied from among the communication controllers in accordance with a set selection condition, wherein
      the wireless transmission schemes are determined by a combination of settings of a modulation scheme, a transmission rate, a communication bandwidth, an encoding rate, and a reception filter.

10. A computer program product having a non-transitory computer readable medium including programmed instructions, wherein the instructions, when executed by a computer including: a wireless transmitter configured to communicate in accordance with a set wireless transmission scheme; and a plurality of communication controllers configured to control the wireless transmitter by different wireless transmission schemes, cause the computer to perform:
   selecting one communication controller to be applied from among the communication controllers in accordance with a set selection condition, wherein
   the wireless transmission schemes are determined by a combination of settings of a modulation scheme, a transmission rate, a communication bandwidth, an encoding rate, and a reception filter.

* * * * *